(12) United States Patent
Smith (10) Patent No.: US 11,865,962 B2
(45) Date of Patent: Jan. 9, 2024

(54) TRAILER ASSEMBLY

(71) Applicant: Fontaine Commercial Trailer, Inc., Springville, AL (US)

(72) Inventor: John R. Smith, Pell City, AL (US)

(73) Assignee: Fontaine Commercial Trailer, Inc., Springville, AL (US)

( * ) Notice: Subject to any disclaimer, the term of this patent is extended or adjusted under 35 U.S.C. 154(b) by 170 days.

(21) Appl. No.: 17/511,109

(22) Filed: Oct. 26, 2021

(65) Prior Publication Data

US 2022/0144159 A1  May 12, 2022

Related U.S. Application Data

(60) Provisional application No. 63/226,335, filed on Jul. 28, 2021, provisional application No. 63/112,228, filed on Nov. 11, 2020.

(51) Int. Cl.
*B60P 7/08* (2006.01)
*B62D 25/20* (2006.01)
*B62D 53/06* (2006.01)

(52) U.S. Cl.
CPC ........ *B60P 7/0815* (2013.01); *B62D 25/2054* (2013.01); *B60Y 2200/145* (2013.01); *B60Y 2304/07* (2013.01); *B62D 53/061* (2013.01)

(58) Field of Classification Search
CPC .. B62D 33/02; B62D 25/2054; B62D 53/061; B60P 7/0815; B60Y 2200/145; B60Y 2200/148; B60Y 2304/07
See application file for complete search history.

(56) References Cited

U.S. PATENT DOCUMENTS

| | | | |
|---|---|---|---|
| 2,753,018 A * | 7/1956 | Curell | B62D 25/2054 D25/123 |
| 3,185,519 A * | 5/1965 | Turnbull | B62D 53/061 280/789 |
| 3,705,732 A * | 12/1972 | Marinelli | B62D 25/2054 280/789 |
| 4,226,465 A | 10/1980 | McCullough | |
| 4,288,957 A * | 9/1981 | Meehan | B62D 25/2054 52/471 |
| 5,788,437 A * | 8/1998 | Kalis, Jr. | B60P 7/0807 410/98 |
| 5,860,777 A | 1/1999 | Walsh et al. | |

(Continued)

*Primary Examiner* — Gregory A Blankenship
(74) *Attorney, Agent, or Firm* — Andrus Intellectual Property Law, LLP (57) ABSTRACT

A flatbed, step-deck, double-drop deck, or lowboy trailer assembly comprises a plurality of metal crossmembers extending in a transverse direction of the trailer assembly; a metal deck supported by the plurality of crossmembers, the metal deck having an upper deck surface and a lower deck surface; and a pair of parallel wooden boards extending in a longitudinal direction of the trailer assembly proximate respective laterally opposite sides of the trailer assembly. Each wooden board in the pair of wooden boards is located in a respective recessed portion of the metal deck. The lower deck surface is situated between and separates a lower surface of each wooden board from the plurality of metal cross members. The lower deck surface is welded to the plurality of crossmembers.

14 Claims, 8 Drawing Sheets
(3 of 8 Drawing Sheet(s) Filed in Color)

(56) References Cited

U.S. PATENT DOCUMENTS

| | | | | |
|---|---|---|---|---|
| 6,015,250 A * | 1/2000 | Walsh | B60P 7/083 |
| | | | 410/104 |
| 6,174,023 B1 * | 1/2001 | Booher | B62D 25/2054 |
| | | | 296/184.1 |
| 6,182,411 B1 * | 2/2001 | Ganser | B62D 25/20 |
| | | | 52/480 |
| 6,250,861 B1 * | 6/2001 | Whitehead | B60P 7/0815 |
| | | | 410/104 |
| 6,283,538 B1 * | 9/2001 | Reitnouer | B62D 33/02 |
| | | | 296/184.1 |
| 6,733,219 B1 * | 5/2004 | Floe | B60D 1/065 |
| | | | 296/57.1 |
| 7,571,953 B2 | 8/2009 | Adams | |
| 8,057,143 B2 | 11/2011 | Adams | |
| 8,393,838 B2 | 3/2013 | Plazek | |
| 8,439,427 B2 | 5/2013 | Adams | |
| 8,915,684 B2 * | 12/2014 | Adams | B65D 88/129 |
| | | | 410/97 |
| 8,985,921 B2 * | 3/2015 | McCloud | B60P 7/0807 |
| | | | 410/116 |
| 9,434,293 B2 | 9/2016 | McCloud | |
| 9,637,042 B2 | 5/2017 | McCloud | |
| 9,676,549 B2 * | 6/2017 | Adams | B65D 90/12 |
| 10,155,544 B2 | 12/2018 | Booher et al. | |
| 11,046,366 B2 | 6/2021 | Booher et al. | |
| 2003/0210966 A1 * | 11/2003 | Haire | B62D 33/04 |
| | | | 410/96 |
| 2006/0071506 A1 * | 4/2006 | Adams | B62D 25/2054 |
| | | | 296/184.1 |
| 2008/0222974 A1 * | 9/2008 | Perkowski | B62D 29/02 |
| | | | 52/591.2 |

\* cited by examiner

TRAILER ASSEMBLY

CROSS-REFERENCE TO RELATED APPLICATIONS

The present application claims the benefit of U.S. Provisional Application No. 63/112,228, filed Nov. 11, 2020, and of U.S. Provisional Application No. 63/226,335, filed Jul. 28, 2021, both of which are hereby incorporated by reference herein in their entireties.

FIELD

The present application relates to flatbed, step-deck, double-drop deck, or lowboy trailers having decks made primarily of metal, with longitudinal nail strips provided in the metal deck.

BACKGROUND

U.S. Pat. No. 7,571,953 discloses a trailer including a floor engageable with a load and a longitudinally extending support member. The support member has an upper portion connected to the floor, a lower portion connectable to a suspension system, and a web extending between the upper and lower portions and transverse to the floor. The lower portion has a lower flange extending transverse to the web and connectable to the suspension system. The lower flange has a first portion extending from a first side of the web a first distance and a second portion extending from a second opposite side of the web a second distance larger than the first distance.

U.S. Pat. No. 8,057,143 discloses a trailer including a floor engageable with a load, the trailer floor comprising a plurality of floor panels. Each floor panel comprises a plurality of tubular portions that are hollow inside to reduce weight. The tubular portions have an upper wall comprising pairs of parallel channels which slideably receive at least one sliding bracket for securing the load to the trailer.

U.S. Pat. No. 8,439,427 discloses an improved side rail structure used to form a portion of a flat bed trailer. The side rail structure is integrally formed as one piece. The side rail structure includes an outer side rail wall which is integrally formed as one piece with a rub rail that projects from the outward surface of the side rail wall.

The above patents are hereby incorporated herein by reference.

SUMMARY

This Summary is provided to introduce a selection of concepts that are further described herein below in the Detailed Description. This Summary is not intended to identify key or essential features of the claimed subject matter, nor is it intended to be used as an aid in limiting the scope of the claimed subject matter.

According to one example, a flatbed, step-deck, double-drop deck, or lowboy trailer assembly comprises a pair of parallel main beams extending in a longitudinal direction of the trailer assembly. A plurality of metal crossmembers extend in a transverse direction of the trailer assembly and are supported by the pair of main beams. A metal deck is supported by the plurality of cross members, the metal deck having an upper deck surface and a lower deck surface. A pair of parallel wooden boards extends in the longitudinal direction of the trailer assembly proximate respective laterally opposite sides of the trailer assembly. Each wooden board in the pair of wooden boards is located in a respective recessed portion of the metal deck such that an upper surface of the wooden board is approximately level with the upper deck surface. The lower deck surface is situated between and separates a lower surface of each wooden board from the plurality of metal cross members.

In one example, the lower deck surface is welded to the plurality of crossmembers.

In one example, the metal deck comprises a plurality of metal floor sections extending in the longitudinal direction of the trailer assembly, and the plurality of metal floor sections are welded to one another in the longitudinal direction of the trailer assembly. In one example, the recessed portions are formed in a pair of the metal floor sections.

In one example, each recessed portion comprises a flange protruding along a laterally outward facing side of a respective metal floor section in the pair of metal floor sections. In one example, the lower deck surface comprises a lower surface of the flange, and the lower surface of the flange is continuous with the lower deck surface. In one example, the flange comprises a stepped portion laterally outwardly spaced from a laterally inward remainder of the respective metal floor section, and the stepped portion has a lower surface that is raised with respect the lower surface of a remainder of the flange.

In one example, a pair of parallel side rails is located at the respective laterally opposite sides of the trailer assembly and welded to the respective metal floor sections comprising the recessed portions. Each parallel side rail has a flange protruding along a laterally inward facing side of the respective side rail, and the flange on each side rail is configured to be located underneath the stepped portion of the flange on the respective metal floor section.

According to another example, a flatbed, step-deck, double-drop deck, or lowboy trailer assembly comprises a plurality of metal crossmembers extending in a transverse direction of the trailer assembly; a metal deck supported by the plurality of crossmembers, the metal deck having an upper deck surface and a lower deck surface; and a pair of parallel wooden boards extending in a longitudinal direction of the trailer assembly proximate respective laterally opposite sides of the trailer assembly. Each wooden board in the pair of wooden boards is located in a respective recessed portion of the metal deck. The lower deck surface is situated between and separates a lower surface of each wooden board from the plurality of metal cross members. The lower deck surface is welded to the plurality of crossmembers.

In one example, the metal deck comprises a plurality of metal floor sections extending in the longitudinal direction of the trailer assembly, and the plurality of metal floor sections are welded to one another in the longitudinal direction of the trailer assembly. In one example, the recessed portions are formed in a pair of the metal floor sections.

In one example, each recessed portion comprises a flange protruding along a laterally outward facing side of a respective metal floor section in the pair of metal floor sections. In one example, the lower deck surface comprises a lower surface of the flange, and the lower surface of the flange is continuous with the lower deck surface. In one example, the flange comprises a stepped portion laterally outwardly spaced from a laterally inward remainder of the respective metal floor section, and the stepped portion has a lower surface that is raised with respect the lower surface of a remainder of the flange.

In one example, a pair of parallel side rails is located at the respective laterally opposite sides of the trailer assembly and welded to the respective metal floor sections comprising the recessed portions. Each parallel side rail has a flange protruding along a laterally inward facing side of the respective side rail, and the flange on each side rail is configured to be located underneath the stepped portion of the flange on the respective metal floor section.

BRIEF DESCRIPTION OF DRAWINGS

The patent or application file contains at least one drawing executed in color. Copies of this patent or patent application publication with color drawing(s) will be provided by the Office upon request and payment of the necessary fee.

The present disclosure is described with reference to the following Figures. The same numbers are used throughout the Figures to reference like features and like components.

DETAILED DESCRIPTION

Before any embodiments of the invention are explained in detail, it is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Unless otherwise specified or limited, the phrases "at least one of A, B, and C," "one or more of A, B, and C," and the like, are meant to indicate A, or B, or C, or any combination of A, B, and/or C, including combinations with multiple instances of A, B, and/or C. Likewise, unless otherwise specified or limited, the terms "mounted," "connected," "linked," "supported," and "coupled" and variations thereof are used broadly and encompass both direct and indirect mountings, connections, supports, and couplings. Further, unless otherwise specified or limited, "connected" and "coupled" are not restricted to physical or mechanical connections or couplings.

As used herein, unless otherwise limited or defined, discussion of particular directions is provided by example only, with regard to particular embodiments or relevant illustrations. For example, discussion of "top," "bottom," "front," "back," "left," "right," "lateral" or "longitudinal" features is generally intended as a description only of the orientation of such features relative to a reference frame of a particular example or illustration. Correspondingly, for example, a "top" feature may sometimes be disposed below a "bottom" feature (and so on), in some arrangements or embodiments. Additionally, use of the words "first," "second", "third," etc. is not intended to connote priority or importance, but merely to distinguish one of several similar elements from another.

Wood boards (including, but not limited to, natural hardwood boards or composite plastic/wood fiber boards) are used for a variety of reasons in conjunction with a metallic floor for flatbed, step-deck, double-drop deck, or lowboy trailers. These boards are generally laid onto crossmembers that extend laterally with respect to the longitudinal main beams of the trailer, and are attached to the crossmembers with fasteners. The resultant floor discontinuity between a metal floor member and a wood board results in force transmittance values exceeding typical aluminum weld fatigue limits. Over time, the welds fail.

Figure 1:
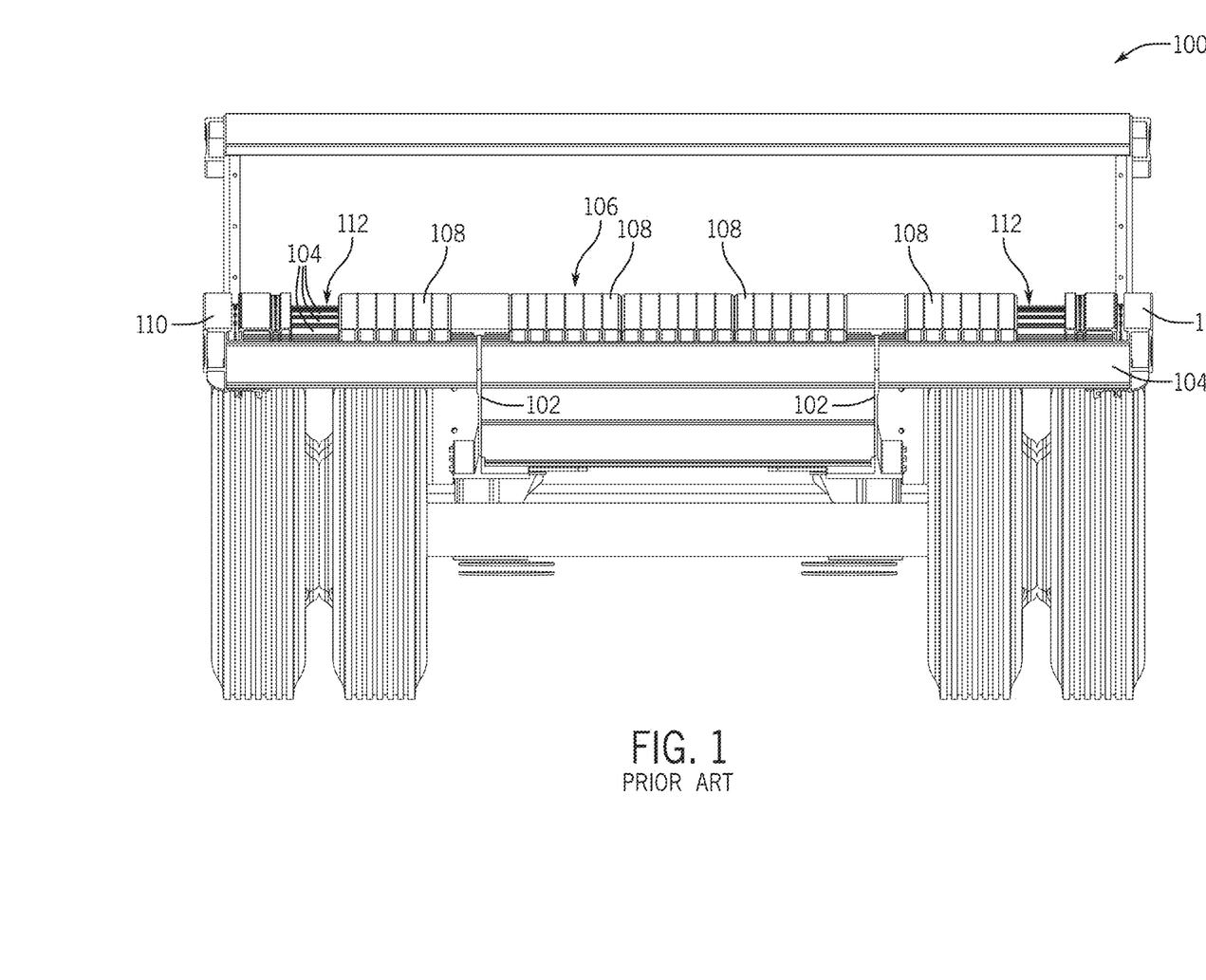
FIG. 1 illustrates a cross section of a trailer assembly according to the prior art.

For example, a cross section of one prior art flatbed trailer is shown in FIG. 1. The trailer assembly 100 includes a pair of parallel main beams 102 extending in a longitudinal direction of the trailer assembly 100. A plurality of metal crossmembers 104 extend in a transverse direction of the trailer assembly 100 and are supported by the pair of main beams 102, such as by extending through slots in the webs of the main beams 102 (see FIG. 3). A metal deck 106 is supported by the plurality of crossmembers 104. The metal deck 106 comprises a plurality of metal floor sections 108 extending in the longitudinal direction of the trailer assembly 100. The lower surface of each metal floor section 108 is welded to the upper flanges of the crossmembers 104. Parallel side rails 110 are located at respective laterally opposite sides of the trailer assembly 100 and welded and/or bolted to the ends of the crossmembers 104.

Between the inboard edges of the side rails 110 and the outboard edges of the outermost floor section 108, the crossmembers 104 are exposed, as shown at 112. Wood boards known as "nail strips" or "tack strips" can be laid into these areas 112 and fastened (e.g., screwed, bolted, adhered) to the crossmembers 104. The wood boards (not shown) are used to allow nails, screws, or other fasteners to be inserted into the floor of the trailer assembly 100, which would otherwise not be as easy to accomplish, given that the remainder of the floor is made of metal. Truckers use such fasteners for attaching load securement devices to the trailer assembly 100.

Figure 2:
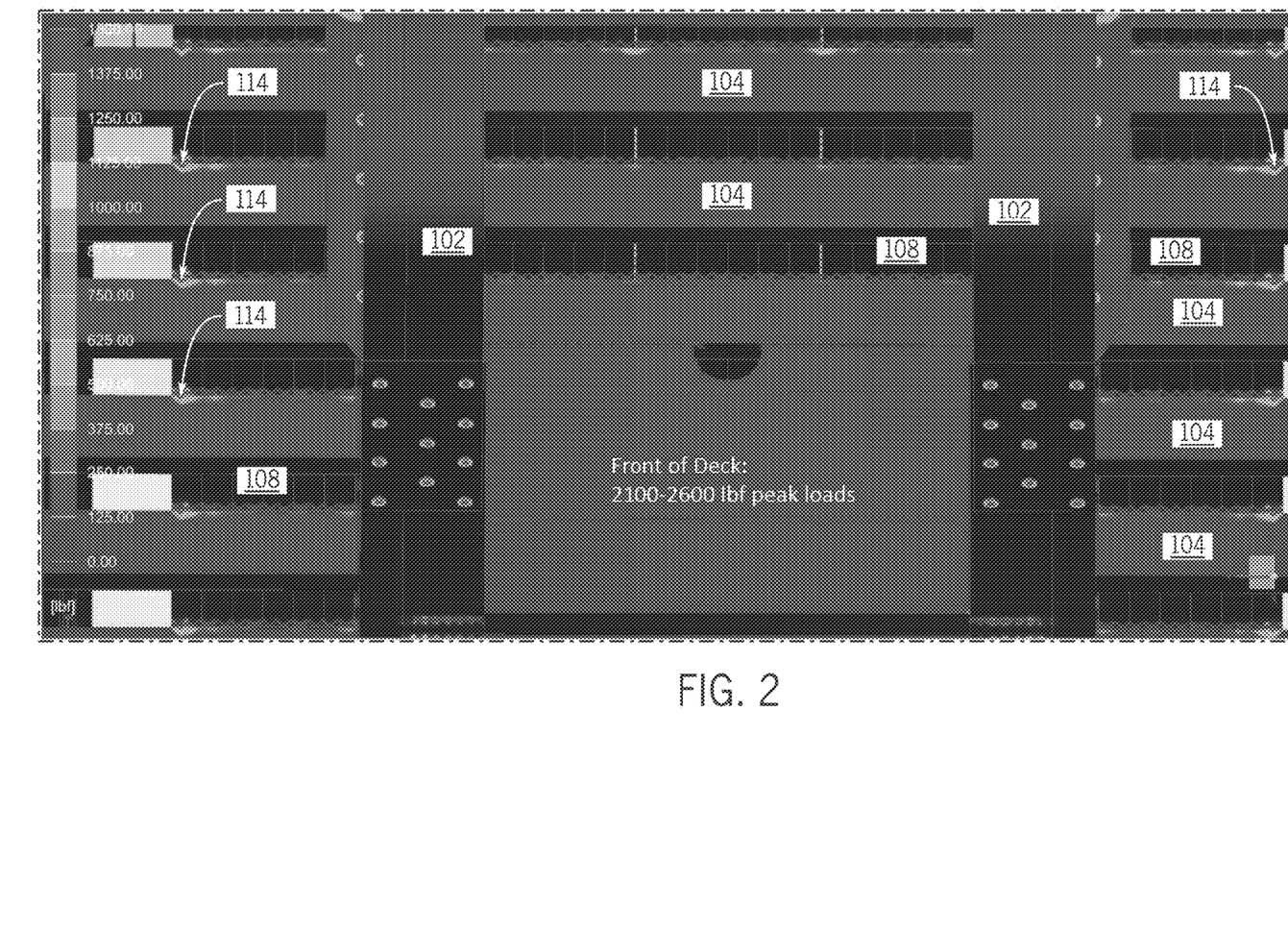
FIG. 2 illustrates a finite element analysis (FEA) of the trailer of FIG. 1 without wooden boards installed thereon.
Figure 3:
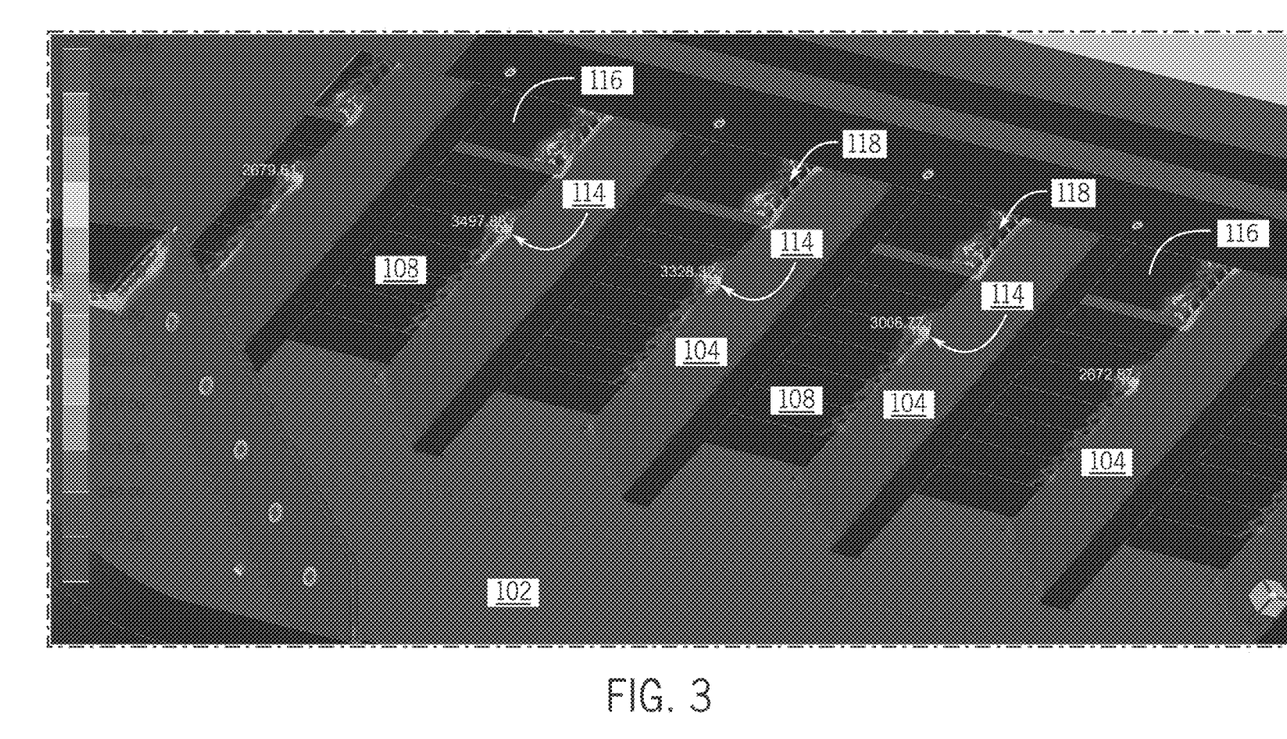
FIG. 3 illustrates an FEA of the trailer of FIG. 1 with wooden boards installed thereon.

FIG. 2 shows a finite element analysis (FEA) of an underside of a model of the trailer assembly 100 of FIG. 1, without the wood boards. It can be seen that at the outboard lateral edges of the welds between the floor sections 108 and the crossmembers 104, the loads on the welds peak, as shown for example at arrows 114. In the example shown, which was modeled with a 52$k$ static coil load on the deck's center, the peak loads in the welds at the noted locations 114 were 2100-2600 lbf. FIG. 3 shows the model with wood boards 116 included. It can be seen that peak loads are present at the ends 114 of the welds, and where the wood boards are bonded full width to the crossmembers 104, as shown for example at 118.

Figure 4:
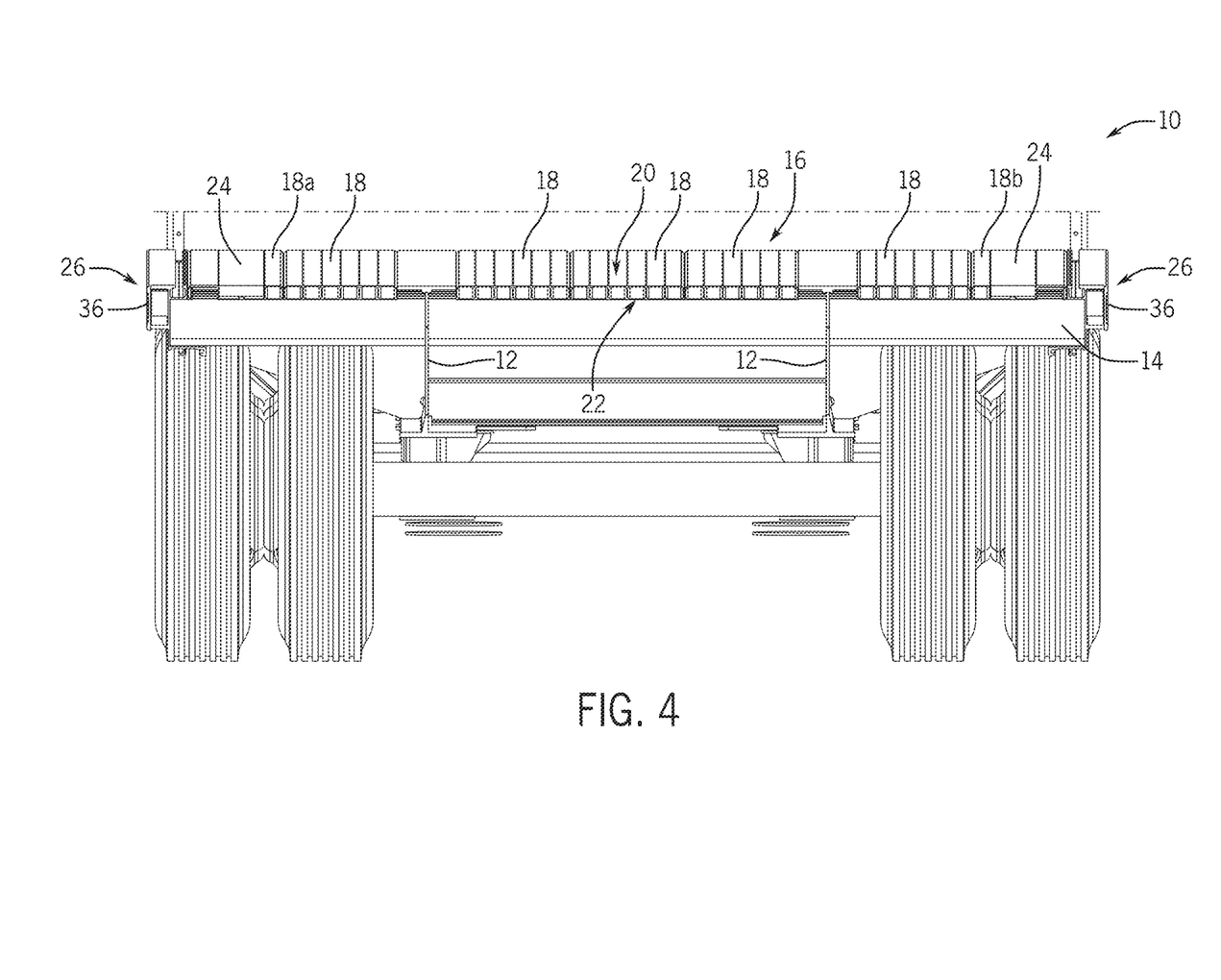
FIG. 4 illustrates a cross section of a trailer assembly according to the present disclosure.

FIG. 4 illustrates a cross section of a trailer assembly 10 according to the present disclosure. The trailer assembly 10 includes a pair of parallel main beams 12 extending in a longitudinal direction of the trailer assembly 10. The main beams 12 are made, for example, of aluminum, but could be made of other suitable weldable material. A plurality of metal crossmembers 14 extend in a transverse direction of the trailer assembly 10 and are supported by the pair of main beams 12, such as by extending through slots 13 in the webs of the main beams 12 (see FIG. 5) and being welded thereto and/or bolted thereto by way of additional plates. Other configurations are possible, such as crossmembers 14 that sit on top of the main beams 12. Although only the nearest crossmember 14 can be seen, it should be understood that additional cross members are located in parallel to that crossmember 14 down the length of the trailer assembly 10, as with the trailer assembly 100 of FIG. 1. See, for example, FIG. 7. The crossmembers 14 are also made, for example, of aluminum, but could be made of other suitable weldable material.

A metal deck 16 is supported by the plurality of crossmembers 14. The metal deck 16 has an upper deck surface 20 and a lower deck surface 22. The metal deck 16 comprises a plurality of metal floor sections 18 extending in the longitudinal direction of the trailer assembly 10, which floor sections 18 may be extruded parts. The plurality of metal floor sections 18 may be made of, for example, aluminum, and are welded to one another in the longitudinal direction of the trailer assembly 10, such as by friction stir welding, MIG welding, or another appropriate type of welding. As such, the combined upper surfaces of the plurality of metal floor sections 18 define at least part of the upper deck surface 20, and the combined lower surfaces of the plurality of metal floor sections 18 define at least part of the lower deck surface 22. The lower deck surface 22 is welded to the plurality of crossmembers 14. As with the other metal components, the metal floor sections 18 could be made of other suitable weldable material.

Figure 5:
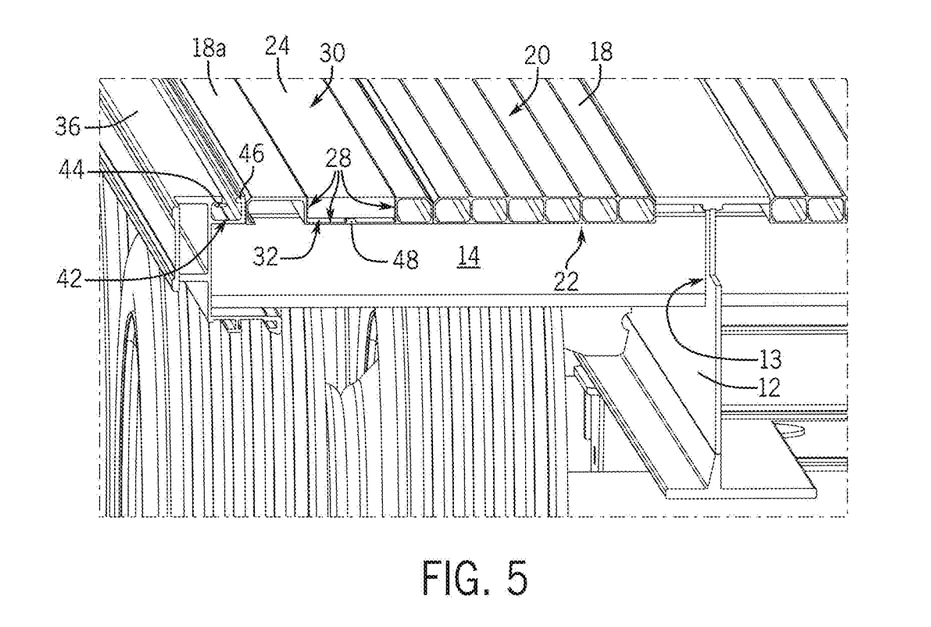
FIG. 5 illustrates a detailed view of a portion of the trailer assembly of FIG. 4.
Figure 6:
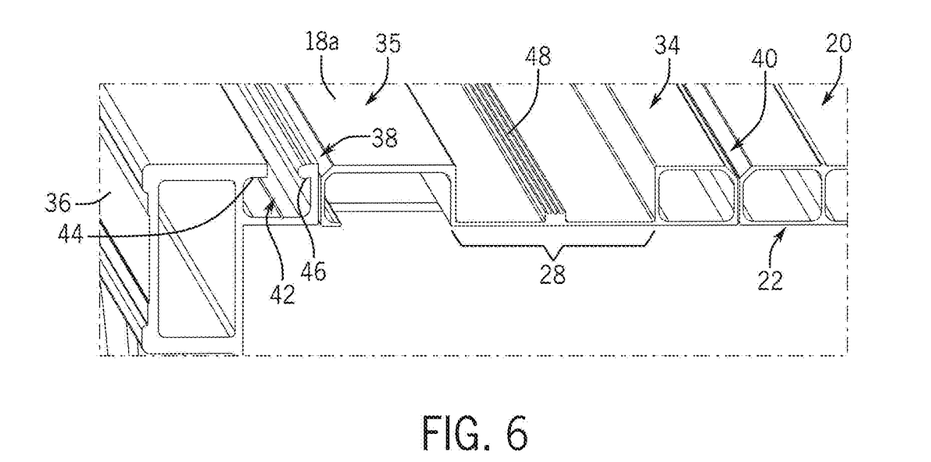
FIG. 6 is a view like that of FIG. 5, but without a wooden board installed on the trailer assembly.

Referring also to FIGS. 5 and 6, a pair of parallel wooden boards 24 extend in the longitudinal direction of the trailer assembly 10 proximate respective laterally opposite sides 26 of the trailer assembly 10. Each wooden board 24 in the pair of wooden boards is located in a respective recessed portion 28 of the metal deck 16 such that an upper surface 30 of the wooden board 24 is approximately level with the upper deck surface 20. According to the present disclosure, the lower deck surface 22 is situated between and separates a lower surface 32 of each wooden board 24 from the plurality of metal crossmembers 14. As such, the lower deck surface 22 can be welded to the crossmembers 14 even directly below the wooden boards 24, as will be described further herein below.

Referring to FIG. 6, one of the recessed portions 28 is shown in greater detail, without the wooden board 24 therein. According to the present disclosure, the recessed portions 28 are formed in two of the metal floor sections, here 18a and 18b (see briefly FIG. 4). Although only one recessed portion 28 is shown in floor section 18a, it should be understood that the other recessed portion 28 is in a floor section 18b that is a mirror image of floor section 18a. The floor sections 18a and 18b differ from the remainder of the floor sections 18 in that they each comprise the recessed portion 28 instead of repeating open-celled or tubular structural units. Each floor section 18a, 18b instead comprises a single tubular structural unit 34 (although more than one tubular structural unit could be provided) on a side of the recessed portion 28 closer to the longitudinal centerline of the trailer assembly 10, and a C-shaped (when viewed 90-degrees counterclockwise) structural section 35 on a side of the recessed portion 28 further from the longitudinal centerline of the trailer assembly 10. The upper surfaces of the tubular structural unit 34 and the C-shaped structural section 35 are part of the upper deck surface 20. The lower surface of the tubular structural unit 34 and the lower surface of the recessed portion 28 are part of the lower deck surface 22.

A pair of parallel side rails 36 is located at respective laterally opposite sides 26 of the trailer assembly 10. Each side rail 36 comprises a recess 42 with an overhanging lip 44 and/or 46 configured to hold a hook of a cargo tiedown apparatus. Inboard of this recess 42, the side rail 36 is welded to the respective metal floor section 18a or 18b comprising the recessed portion 28. Such welding is made where a beveled edge of the inboard-most side of the side rail 36 meets the outboard-most side of the floor section 18a or 18b, as shown at location 38 (FIG. 6). Likewise, the inboard-most sides of the floor sections 18a, 18b are welded to the outboard-most sides of the respective floor sections 18 adjacent thereto, as shown at location 40 (FIG. 6). Again, such welding could be done by friction stir welding, MIG welding, or other appropriate welding. The side rails 36 and floor sections 18a,b can each be made of the same material (e.g., aluminum) as the floor sections 18, or each of a different material that is weld compatible with the material of the floor sections 18 and of the crossmembers 14.

As shown in FIG. 6, each recessed portion 28 comprises an upwardly projecting ridge 48 therein extending in the longitudinal direction of the trailer assembly 10. The wooden board 24 rests on the ridge 48, as shown in FIG. 5. The wooden board 24 can be fastened (screwed, bolted, adhered, etc.) to the floor section 18a or 18b at the location of the ridge 48. The thicker cross-sectional dimension at the ridge 48, as compared to that of the remainder of the recessed portion 28, provides more material for the fastener to connect with. Additionally, the open spaces between the lower surface 32 of the wooden board 24 and the upper surface of the recessed portion 28 on either side of the ridge 48 provide some extra depth for fasteners (nails, screws, etc.) inserted into the wooden board 24 for load securement purposes. Finally, because the wooden board 24 is not touching the upper surface of the recessed portion 28 other than at the ridge 48, water that collects on the trailer assembly 10 can flow under the wooden board 24 on either side of the ridge 48, and the wooden board 24 will not sit in the water, which might otherwise reduce the life of the wooden board 24.

In some examples, instead of the center floor section 18 running down the longitudinal centerline of the trailer assembly 10, a floor section with a recessed portion 28 is provided at that location. The recessed portion 28 can be provided between tubular structural units (see, e.g., 34, FIG. 6), with one or two tubular structural units 34 provided on each side of the recessed portion 28 to form a symmetrical floor section capable of supporting a wooden board 24 along the longitudinal centerline of the trailer assembly 10. Of course, floor sections with recessed portions for wooden boards could be provided at locations other than those described herein, as befitting a particular trailer's application.

Figure 7:
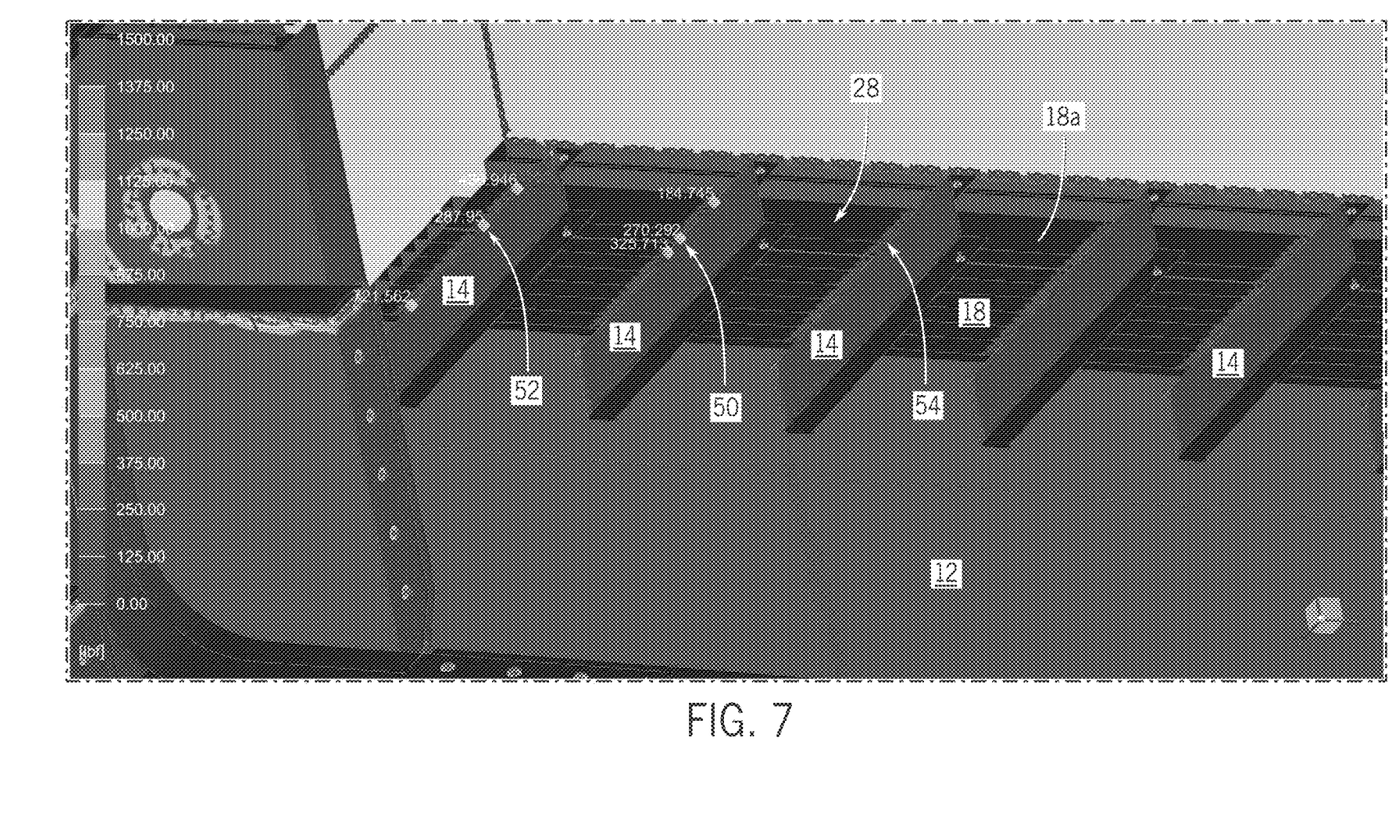
FIG. 7 is an FEA of the trailer assembly of FIG. 4.

FIG. 7 shows a bottom perspective view of a FEA of a model of a trailer assembly 10 according to FIGS. 4-6, under the same loading conditions used to model the trailer assembly 100 of FIG. 1. The loads at various points along the welds 54 are shown, including just inboard of where the wooden board 24 would sit. Recall that in FIG. 3, loads at similar locations to those noted here ranged from about 1680 lbf to about 3000 lbf. In contrast, the loads on the welds 54 in the trailer assembly 10 as shown in FIG. 7 range from about 270 lbf to about 290 lbf, as shown at locations 50 and 52. The welds 54 extend fully under the recessed portion 28 of the floor section 18a, eliminating the localized application of force seen at locations 114 in FIG. 3.

Thus, it can be seen by comparison of FIGS. 3 and 7 that by creating a continuous floor plank surface (including floor sections 18, 18a, 18b), including underneath the wooden boards 24, the force transmittances through the welds 54 are significantly reduced. The floor sections 18a, 18b abut the adjacent metal floor sections 18 to create a homogenous skin that houses the wooden boards 24. All metal floor sections 18, 18a, 18b are welded together on their outermost surfaces (i.e., at locations 38, 40, FIG. 6), where shear stresses due to bending are theoretically non-existent. The ability to substantially decrease weld force transmittance levels where the welds 54 connect the floor sections 18, 18a, 18b to the crossmembers 14 significantly extends vehicle longevity. Typically, if a weld fails at one of the locations indicated herein, the weld is attempted to be re-welded. However, in the event that the parts being re-welded are aluminum, as contemplated herein, this only makes the weld less strong in the long run.

The geometry of the floor sections 18a and 18b shown herein is exemplary only and is dictated by a given trailer's requirements. In some examples, the side rails 36 can be extruded as the same part as the floor section 18a or 18b. In some examples, the floor section 18 can be extruded as the same part as the floor section 18a or 18b. In some examples, as shown herein, the floor sections 18a and 18b are extruded separately from the remainder of the trailer assembly 10. Other methods of manufacturing floor sections 18a,b and side rails 36 separately or integrally as a single part could be used, but extrusion is particularly cost effective given the geometry of the parts and their continuous cross-sectional shape along their longitudinal length.

Figure 8:
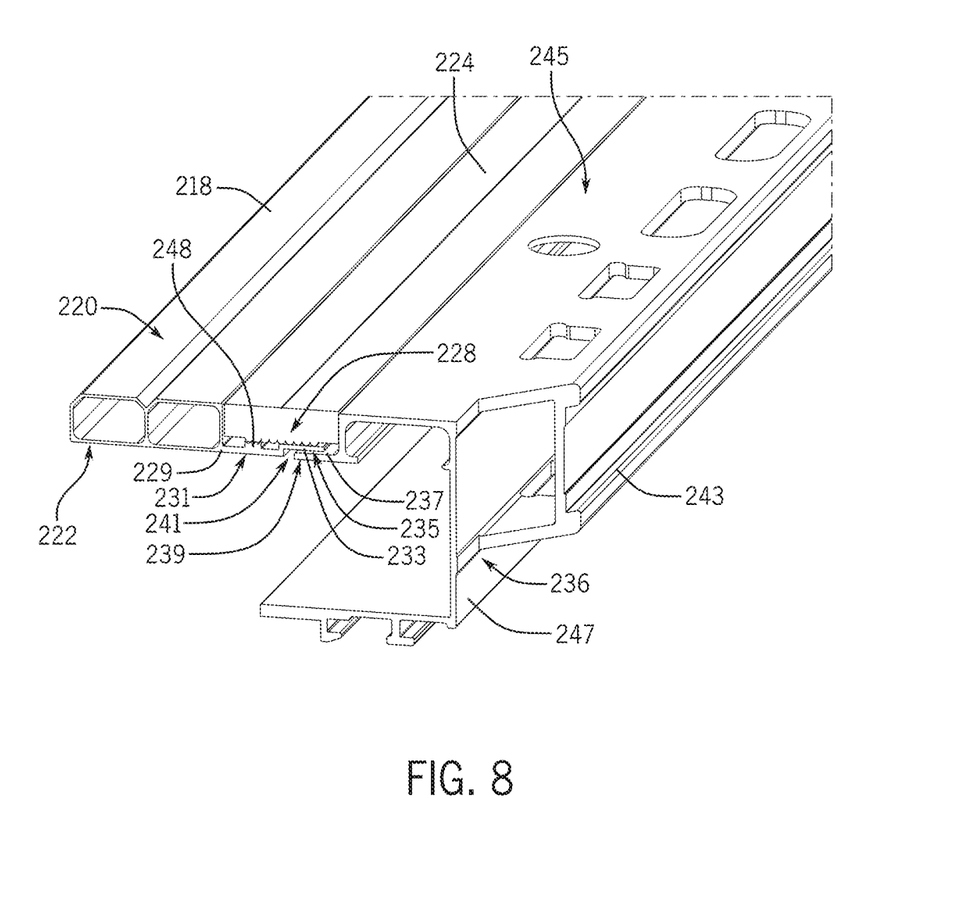
FIG. 8 is a perspective view of a floor section and side rail for a trailer assembly according to another example.

FIG. 8 illustrates another embodiment of a floor section 218 that could be provided on the outer lateral sides of the trailer assembly of FIG. 4, instead of the floor sections 18a, 18b. FIG. 8 shows the floor section 218 as it would look from the rear on the right side of the trailer assembly, it being understood that the opposite side of the trailer assembly would have a floor section that is a mirror image. The floor section 218 comprises a recessed portion 228 that is recessed from the upper deck surface 220. In this example, the recessed portion 228 comprises a flange 229 protruding along a laterally outward facing side of the respective floor section 218. The lower deck surface 222 comprises a lower surface 231 of the flange 229, and the lower surface 231 of the flange 229 is continuous with the lower deck surface 222. For example, the lower surface 231 of the flange 229 is horizontally aligned with and co-formed with the lower deck surface 222. The could be accomplished, for example, by extruding the flange 229 along with the remainder of the floor section 218.

The flange 229 comprises a stepped portion 233 laterally outwardly spaced from a laterally inward remainder of the floor section 218. The stepped portion 233 has a lower surface 235 that is raised with respect the lower surface 231 of a remainder of the flange 229. An upwardly projecting ridge 248 is located within the recessed portion 228. The ridge 248 extends in the longitudinal direction of the trailer assembly and is laterally spaced between the stepped portion 233 and the laterally inward remainder of the floor section 218. The ridge 248 serves the same purposes as ridge 48 noted hereinabove.

As with the first embodiment of FIGS. 4-6, a pair of parallel side rails is located at the respective laterally opposite sides of the trailer assembly and welded to the respective metal floor sections 218 comprising the recessed portions 228. The side rail 236 shown in FIG. 8 has a flange 237 protruding along a laterally inward facing side of the side rail 236. The flange 237 on the side rail 236 is configured to be located underneath the stepped portion 233 of the flange 229 on the floor section 218, as shown. In fact, an upper surface of the flange 237 contacts and supports the lower surface 235 of the stepped portion 233. A lower surface 239 of the flange 237 on the side rail 236 is configured to be horizontally aligned with the lower surface 231 of the remainder of the flange 229 on the floor section 218. Thus, the thickness of the material forming the flange 237 is selected to match or closely match the difference in dimension between the lower surface 235 of the stepped portion 233 of the flange 229 and the lower surface 231 of the laterally inward remainder of the flange 229. The lateral extent of the flange 229 on the floor section 218 and the lateral extent of the flange 237 on the side rail 236, as well as the lateral extent of the stepped portion 233, are configured to support the wood board 224 therebetween. The flange 237 and the flange 229 can be welded together along their longitudinal lengths within a gap 241 therebetween.

As with the first embodiment, the wooden board 224 is located in the recessed portion 228 of the metal deck such that an upper surface of the wooden board 224 is approximately level with the upper deck surface 220. The lower deck surface 222 (including lower surface 231 of flange 229) is situated between and separates a lower surface of the wooden board 224 from the plurality of metal cross members 14. The floor section 218 and side rail 236 can be welded along the lateral width of the recessed portion 228, including along the lower surface 231 of the flange 229 and along the lower surface 239 of the flange 237, to the upper surfaces of the crossmembers 14. This substantially decreases weld force transmittance levels where the welds connect the floor section 218 and the flange 237 of the side rail 236 to the crossmembers 14, significantly extending vehicle longevity, as in the first embodiment. The decrease in weld force transmittance levels is on the order of that shown and described hereinabove with respect to the first embodiment.

Note that the geometries of the adjacent edges of the floor section 218 and the side rail 236 are exemplary and could be other than shown here. For example, the edge geometries could be reversed, that is, the side rail 236 could be provided with a flange that is stepped upwardly on its laterally inward most edge, while the laterally outermost edge of the flange on the floor section 218 could be level with the remainder of the recessed portion. In still another example, the two flanges are coupled by a welded butt joint.

Figure 9:
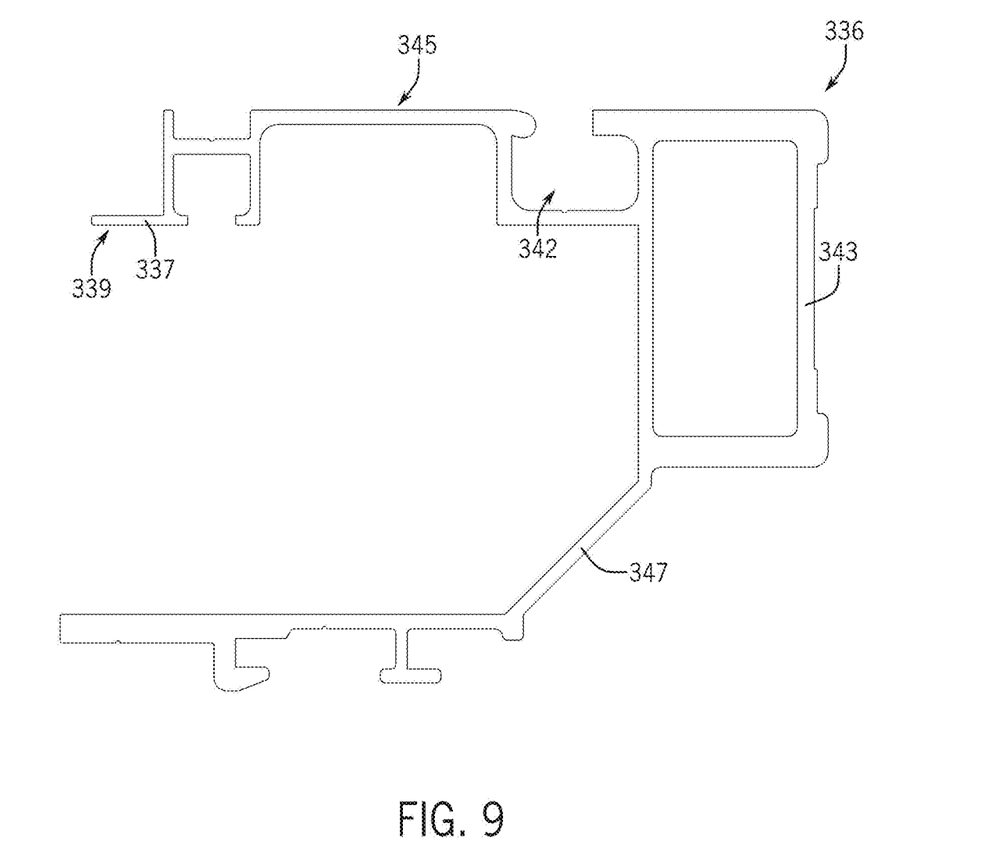
FIG. 9 is a cross-sectional view of a side rail for a trailer assembly according to another example.

While FIG. 8 shows a side rail 236 with no hook recess (see 42, FIG. 5), it should be understood that a recess can be provided between the rub rail 243 and the floor surface 245 of the side rail 236. For example, FIG. 9 shows an example with a hook recess 342 between the rub rail 343 and the floor surface 345 of the side rail 336. Also in contrast to the example of FIG. 8, FIG. 9 shows an example in which the sidewall 347 of the side rail 336 below the rub rail 343 is angled inwardly, from top to bottom, toward the center of the trailer. This angled sidewall 347 provides increased space below the rub rail 343 to allow machining equipment better access for routing than does the location of the sidewall 247 in the example of FIG. 8. It should be understood that the angled wall concept of FIG. 9 could be used without the recess 342, and the rub rail 343 could be directly adjacent the floor surface 345 as in the example of FIG. 8. Any components not specifically described with respect to FIG. 9 are the same as those described with respect to FIG. 8, only labeled with a "3" in the hundreds place instead of a "2." Further, the side rail 336 would be used with a floor section 218 like that shown in FIG. 8.

In one example, the floor sections 18, 18a,b, 218 are made of any grade of extrudable aluminum that is weld-compatible with the surrounding floor sections 18, 218 and side rails 36, 236, 336.

In the above description certain terms have been used for brevity, clarity and understanding. No unnecessary limitations are to be implied therefrom beyond the requirement of the prior art because such terms are used for descriptive purposes only and are intended to be broadly construed. The different assemblies described herein above may be used in alone or in combination with other assemblies and systems. Various equivalents, alternatives and modifications are possible within the scope of the appended claims.

What is claimed is:

1. A flatbed, step-deck, double-drop deck, or lowboy trailer assembly comprising:
   a pair of parallel main beams extending in a longitudinal direction of the trailer assembly;
   a plurality of metal crossmembers extending in a transverse direction of the trailer assembly and supported by the pair of main beams;
   a metal deck supported by the plurality of crossmembers, the metal deck having an upper deck surface and a lower deck surface; and
   a pair of parallel wooden boards extending in the longitudinal direction of the trailer assembly proximate respective laterally opposite sides of the trailer assembly;
   wherein each wooden board in the pair of wooden boards is located in a respective recessed portion of the metal deck such that an upper surface of the wooden board is approximately level with the upper deck surface;
   wherein the lower deck surface is situated between and separates a lower surface of each wooden board from the plurality of metal crossmembers;
   wherein the metal deck comprises a plurality of metal floor sections extending in the longitudinal direction of the trailer assembly, the plurality of metal floor sections being welded to one another in the longitudinal direction of the trailer assembly;
   wherein the recessed portions are formed in a pair of the metal floor sections; and
   wherein each recessed portion comprises a flange protruding along a laterally outward facing side of a respective metal floor section in the pair of metal floor sections.

2. The trailer assembly of claim 1, further comprising a pair of parallel side rails located at the respective laterally opposite sides of the trailer assembly and welded to the respective metal floor sections comprising the recessed portions.

3. The trailer assembly of claim 2, wherein each side rail comprises a recess with an overhanging lip configured to hold a hook of a cargo tiedown apparatus.

4. The trailer assembly of claim 1, wherein the lower deck surface comprises a lower surface of the flange, and the lower surface of the flange is continuous with the lower deck surface.

5. The trailer assembly of claim 4, wherein the flange comprises a stepped portion laterally outwardly spaced from a laterally inward remainder of the respective metal floor section, the stepped portion having a lower surface that is raised with respect the lower surface of a remainder of the flange.

6. The trailer assembly of claim 5, further comprising an upwardly projecting ridge within each recessed portion, the ridge extending in the longitudinal direction of the trailer assembly and being laterally spaced between the stepped portion and the laterally inward remainder of the respective metal floor section.

7. The trailer assembly of claim 5, further comprising a pair of parallel side rails located at the respective laterally opposite sides of the trailer assembly and welded to the respective metal floor sections comprising the recessed portions;
   wherein each parallel side rail has a flange protruding along a laterally inward facing side of the respective side rail, the flange on each side rail configured to be located underneath the stepped portion of the flange on the respective metal floor section.

8. The trailer assembly of claim 7, wherein a lower surface of the flange on each side rail is configured to be horizontally aligned with the lower surface of the remainder of the flange on each metal floor section.

9. The trailer assembly of claim 1, wherein each recessed portion comprises an upwardly projecting ridge therein extending in the longitudinal direction of the trailer assembly.

10. The trailer assembly of claim 1, wherein the lower deck surface is welded to the plurality of metal crossmembers.

11. A flatbed, step-deck, double-drop deck, or lowboy trailer assembly comprising:
   a plurality of metal crossmembers extending in a transverse direction of the trailer assembly;
   a metal deck supported by the plurality of crossmembers, the metal deck having an upper deck surface and a lower deck surface; and
   a pair of parallel wooden boards extending in a longitudinal direction of the trailer assembly proximate respective laterally opposite sides of the trailer assembly;
   wherein each wooden board in the pair of wooden boards is located in a respective recessed portion of the metal deck;
   wherein the lower deck surface is situated between and separates a lower surface of each wooden board from the plurality of metal crossmembers;
   wherein the lower deck surface is welded to the plurality of metal crossmembers;
   wherein the metal deck comprises a plurality of metal floor sections extending in the longitudinal direction of the trailer assembly, the plurality of metal floor sections being welded to one another in the longitudinal direction of the trailer assembly;
   wherein the recessed portions are formed in a pair of the metal floor sections; and
   wherein each recessed portion comprises a flange protruding along a laterally outward facing side of a respective metal floor section in the pair of metal floor sections.

12. The trailer assembly of claim 11, wherein the lower deck surface comprises a lower surface of the flange, and the lower surface of the flange is continuous with the lower deck surface.

13. The trailer assembly of claim 12, wherein the flange comprises a stepped portion laterally outwardly spaced from a laterally inward remainder of the respective metal floor section, the stepped portion having a lower surface that is raised with respect the lower surface of a remainder of the flange.

14. The trailer assembly of claim 13, further comprising a pair of parallel side rails located at the respective laterally opposite sides of the trailer assembly and welded to the respective metal floor sections comprising the recessed portions;
   wherein each parallel side rail has a flange protruding along a laterally inward facing side of the respective side rail, the flange on each side rail configured to be located underneath the stepped portion of the flange on the respective metal floor section.

* * * * *